United States Patent
Liu et al.

(10) Patent No.: US 11,844,124 B2
(45) Date of Patent: Dec. 12, 2023

(54) COMMUNICATION METHOD FOR WIRELESS DEVICE, WIRELESS DEVICE AND COMPUTER READABLE STORAGE MEDIUM

(71) Applicant: SHENZHEN BLUETRUM TECHNOLOGY CO., LTD., Guangdong (CN)

(72) Inventors: Zhuzhan Liu, Guangdong (CN); Jingfa Liu, Guangdong (CN); Jinhong Lin, Guangdong (CN); Hanping Wu, Guangdong (CN); Fanbo Kong, Guangdong (CN)

(73) Assignee: SHENZHEN BLUETRUM TECHNOLOGY CO., LTD., Guangdong (CN)

( * ) Notice: Subject to any disclaimer, the term of this patent is extended or adjusted under 35 U.S.C. 154(b) by 556 days.

(21) Appl. No.: 17/260,568

(22) PCT Filed: Sep. 1, 2020

(86) PCT No.: PCT/CN2020/112795
§ 371 (c)(1),
(2) Date: Jan. 15, 2021

(87) PCT Pub. No.: WO2022/047612
PCT Pub. Date: Mar. 10, 2022

(65) Prior Publication Data
US 2022/0338284 A1    Oct. 20, 2022

(51) Int. Cl.
*H04W 76/15*    (2018.01)
*H04W 76/18*    (2018.01)
(Continued)

(52) U.S. Cl.
CPC ....... *H04W 76/15* (2018.02); *H04W 72/0446* (2013.01); *H04W 76/14* (2018.02); *H04W 76/18* (2018.02)

(58) Field of Classification Search
None
See application file for complete search history.

(56) References Cited

U.S. PATENT DOCUMENTS
2019/0335378 A1    10/2019    Parangattil et al.

FOREIGN PATENT DOCUMENTS
CN    106954179 A    7/2017
CN    109495869 A    3/2019
(Continued)

OTHER PUBLICATIONS

First Office Action dated Mar. 12, 2021 for Chinese patent application No. 202080001810.2, English translation provided by Global Dossier.
(Continued)

*Primary Examiner* — Walter J Divito
(74) *Attorney, Agent, or Firm* — Yue (Robert) Xu; Apex Attorneys at Law, LLP

(57) ABSTRACT

A communication method for a wireless device, a wireless device and a computer readable storage medium are provided to reduce power consumption of a master device in the wireless device and balance power consumptions of the master device and a slave device. The communication method for a wireless device according to the embodiments of the present disclosure includes: alternately serving, by the master device and the slave device of the wireless device, as a responder, and sending, by the responder, a response message to the terminal via the first Bluetooth link. The response message indicates a result of receiving the Bluetooth data by the wireless device.

10 Claims, 5 Drawing Sheets

(51) Int. Cl.
*H04W 76/14* (2018.01)
*H04W 72/0446* (2023.01)

(56) References Cited

FOREIGN PATENT DOCUMENTS

| | | | |
|---|---|---|---|
| CN | 109922540 A | 6/2019 | |
| CN | 110753284 A | 2/2020 | |
| CN | 111031437 A | 4/2020 | |
| CN | 111132110 A | 5/2020 | |
| CN | 111163450 A | 5/2020 | |
| CN | 111432386 A | 7/2020 | |
| WO | WO-2020107691 A1 * | 6/2020 | ............ H04W 4/80 |

OTHER PUBLICATIONS

International Search Report and Written Opinion of the International Search Authority for PCT patent application No. PCT/CN2020/112795.

* cited by examiner

COMMUNICATION METHOD FOR WIRELESS DEVICE, WIRELESS DEVICE AND COMPUTER READABLE STORAGE MEDIUM

This application is the national phase of International Application No. PCT/CN2020/112795, titled "COMMUNICATION METHOD FOR WIRELESS DEVICE, WIRELESS DEVICE AND COMPUTER READABLE STORAGE MEDIUM", filed on Sep. 1, 2020, which is incorporated herein by reference in its entirety.

FIELD

The present disclosure relates to the field of wireless communication, and in particular to a communication method for a wireless device, a wireless device and a computer readable storage medium.

BACKGROUND

A communication method for a conventional Bluetooth wireless device, such as a Bluetooth headset (including a master device and a slave device), to communicate with a terminal is as follows. A first Bluetooth link is established between the terminal and the master device, and a second Bluetooth link is established between the master device and the slave device. The slave device obtains link information of the first Bluetooth link via the second Bluetooth link. The terminal sends data to the master device via the first Bluetooth link. The slave device monitors the first Bluetooth link based on the link information of the first Bluetooth link, receives the data, and synchronously plays the data based on the communication via the second Bluetooth link.

In the above communication method for the wireless device, the master device is in communications with the salve device and the terminal, thus the power consumption of the master device is high, resulting in unbalanced power consumptions of the master device and the slave device. In the field of wireless communication, the problem of unbalanced power consumptions is generally solved by switching between the master device and the slave device. Specifically, after the master device and the slave device operate for a period of time, the master device and the slave device exchange roles, that is, the original slave device serves as the master device and the original master device serves as a slave device, achieving a balance between power consumptions.

According to the conventional technology, it requires a long time period for switching between the master device and the slave device. During the switching, the master device and the slave device interact multiple times to transfer the first Bluetooth link, and the master device and the slave device cannot communicate with the terminal, resulting in problems such as pauses and disconnection. Therefore, a better communication method is required for balancing the power consumptions of the master device and the slave device.

SUMMARY

A communication method for a wireless device, a wireless device and a computer readable storage media are provided according to the embodiments of the present disclosure to reduce power consumption of a master device in the wireless device and balance power consumptions of the master device and a slave device.

According to a first aspect of the present disclosure, a communication method for a wireless device is provided. The wireless device includes a master device and a slave device. The communication method for a wireless device may include:

communicating, by the master device, with a terminal via a first Bluetooth link, communicating, by the master device, with the slave device via a second Bluetooth link, and sending, by the master device, link information of the first Bluetooth link to the slave device via the second Bluetooth link;

monitoring, by the slave device, the first Bluetooth link, and receiving, by the slave device, Bluetooth data sent by the terminal to the master device;

alternately serving, by the master device and the slave device of the wireless device, as a responder; and sending, by the responder, a response message to the terminal via the first Bluetooth link, where the response message indicates a result of receiving the Bluetooth data by the wireless device.

In an embodiment of the present disclosure, the alternately serving, by the master device and the slave device of the wireless device, as a responder may include:

alternately serving, by the master device and the slave device of the wireless device, as the responder at an interval of one or more consecutive slots.

In an embodiment of the present disclosure, the alternately serving, by the master device and the slave device of the wireless device, as a responder may include:

configuring one of the master device and the slave device of the wireless device as a fixed authority manager, where the other one of the master device and the slave device of the wireless device is a non-authority manager;

notifying, by the authority manager, the non-authority manager to serve as a responder in a current slot in a case that the authority manager successfully receives Bluetooth data from the terminal in the current slot; and serving, by the authority manager, as a responder in a current slot in a case that the authority manager fails to receive Bluetooth data from the terminal in the current slot.

In an embodiment of the present disclosure, the alternately serving, by the master device and the slave device of the wireless device, as a responder may include:

determining a responder serving in a current slot based on a result of receiving Bluetooth data in the current slot by a responder serving in a previous slot.

In an embodiment of the present disclosure, the determining a responder serving in a current slot based on a result of receiving Bluetooth data in the current slot by a responder serving in a previous slot includes:

notifying, by the responder in the previous slot, a non-responder in the previous slot to serve as the responder in the current slot in a case that the responder in the previous slot successfully receives the Bluetooth data in the current slot, where the non-responder is one of the master device and the slave device that does not serve as the responder; and serving, by the responder in the previous slot, as the responder in the current slot in a case that the responder serving in the previous slot fails to receive the Bluetooth data in the current slot.

In an embodiment of the present disclosure, the communication method for a wireless device may further include:

performing, by the wireless device, an authority reset operation at a predetermined time interval to designate the master device or the slave device as the responder in the current slot.

In an embodiment of the present disclosure, the predetermined time interval is less than a time period for the terminal to send a same piece of Bluetooth data with a maximum number of attempts.

In an embodiment of the present disclosure, the communication method for a wireless device may further include:
monitoring, by a non-responder, the response message while the responder sends the response message to the terminal, where the non-responder is one of the master device and the slave device that does not serve as the responder.

According to a second aspect of the present disclosure, a wireless device is provided. The wireless device includes a processor. The processor is configured to execute a computer program stored in a memory to perform the communication method for a wireless device.

According to a third aspect of the present disclosure, a computer readable storage medium storing a computer program is provided. The computer program, when executed by a processor, performs the communication method for a wireless device.

In the communication method for a wireless device according to the present disclosure, the master device and the slave device alternately serve as the responder to respond to the terminal. Therefore, the slave device shares the power consumption of the master device for responding to the terminal without affecting the communication between the master device and the terminal and the communication between the slave device and the terminal, effectively balancing the power consumptions of the master device and the slave device.

DETAILED DESCRIPTION OF THE EMBODIMENTS

The technical solutions in the embodiments of the present disclosure are clearly and completely described below in conjunction with the drawings in the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

Terms of "the first", "the second", "the third", "the fourth" and the like (if exists) in the specification, the claims and the drawings of the present disclosure are used to distinguish an object from other similar objects rather than describe a specific order or a sequence. It should be understood that the above terms may be exchanged in proper cases so as to implement the embodiments described herein in other orders than an order shown or described herein. In addition, terms of "include", "comprise" or any other variants thereof are intended to be non-exclusive. For example, a process, a method, a system, a product or a device including a series of steps or units is not limited to including the listed steps or units but may include a step or unit not listed and an inherent step or unit in the process, the method, the process or the device.

Figure 1A:
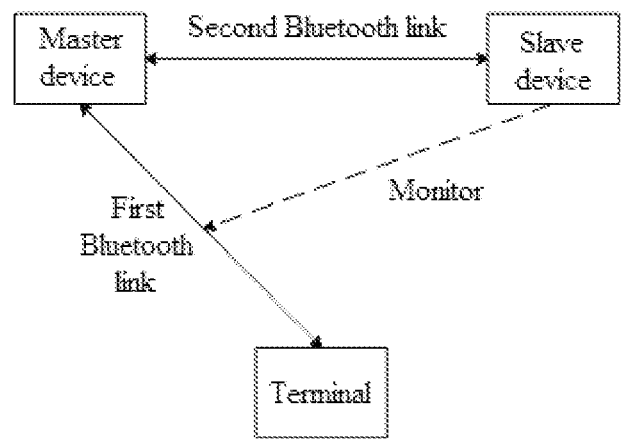
FIG. 1A and FIG. 1B are schematic diagrams showing communications between a master device, a slave device and a terminal according to the present disclosure.
Figure 1B:
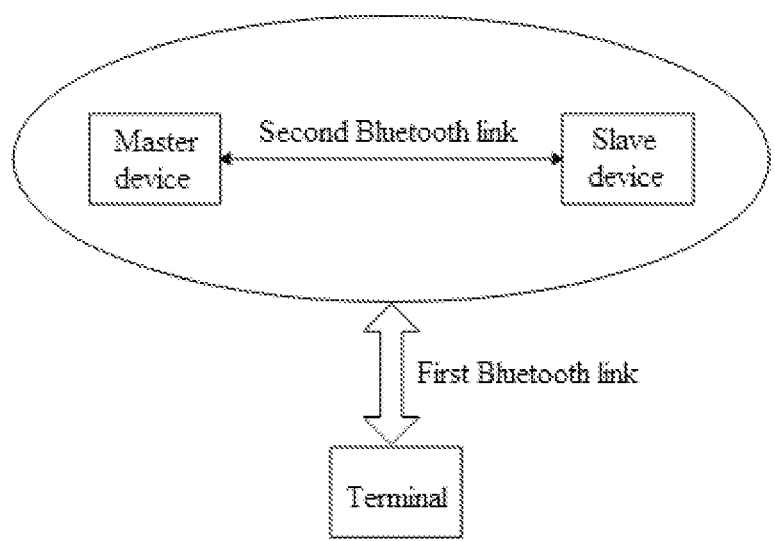

Reference is made to FIG. 1A and FIG. 1B, which show a basic communicational structure in the technology solutions according to the present disclosure. In FIG. 1A, a master device communicates with a terminal via a first Bluetooth link, and communicates with a slave device via a second Bluetooth link. After the first Bluetooth link and the second Bluetooth link are established, the master device sends link information of the first Bluetooth link to the slave device via the second Bluetooth link. The slave device monitors the communication between the master device and the terminal based on the link information of the first Bluetooth link and obtains the content of the communication between the master device and the terminal. Generally, the master device and the slave device perform timing synchronization via the second Bluetooth link. Thus, the slave device monitors the communication between the master device and the terminal at time pre-appointed by the master device and the terminal. After both the master device and the slave device receive data, the master device and the slave device decode the data synchronously.

In FIG. 1B, while the slave device monitors based on the link information of the first Bluetooth link, the master device and the slave device may be considered as one device for the terminal. When the device sends data to the terminal, the data source may be the master device or the slave device.

It should be understood that the wireless device in the present disclosure may be a Bluetooth headset (including a master headset and a slave headset), or may be other Bluetooth device such as a Bluetooth interphone and Bluetooth speaker pairs, which is not limited herein.

Based on the above communicational structure, a communication method for a wireless device is provided according to the present disclosure. The method may include: alternately serving, by the master device and the slave device of the wireless device, as a responder; and sending, by the responder, a response message to the terminal via the first Bluetooth link. The response message indicates a result of receiving the Bluetooth data by the wireless device.

In the communication method for a wireless device according to the present disclosure, the master device and the slave device alternately serve as the responder to respond to the terminal. Therefore, the slave device shares the power consumption of the master device for responding to the terminal without affecting the communication between the master device and the terminal and the communication between the slave device and the terminal, effectively balancing the power consumptions of the master device and the slave device.

In practices, the communication between the master device and the terminal, the communication between the slave device and the terminal, and the communication between the master device and the slave device include multiple time periods each of which includes one or more terminal slots (hereinafter referred to as time slots or slots). In one or more time periods, processes such as data sending and result response are performed.

In an embodiment, that the master device and the slave device of the wireless device alternately serve as a responder may include: alternately serving, by the master device and the slave device of the wireless device, as the responder at an interval of one or more consecutive slots, and one of the master device and the slave device that does not serve as the responder is a non-responder; and sending, by the responder after obtaining a result of receiving data by the non-responder, a response message to the terminal. The response message indicates a result of receiving the Bluetooth data by the wireless device. In the embodiment, as the responder, the master device or the slave device responds to the terminal based on the result of receiving data by the master device and the result of receiving data by the slave device.

In an embodiment, as a scenario A1, the master device and the slave device alternately serve as the responder at an interval of one or more consecutive slots. After obtaining a result of receiving data by the non-responder, the responder responds to the terminal based on the result and a result of receiving data by the responder. In a case that the responder and the non-responder successfully receive Bluetooth data, the responder responds to the terminal with an ACK response (instructing the terminal to send new Bluetooth data in a next time period). In a case that at least one of the responder and the non-responder fails to receive Bluetooth data from the terminal, the responder responds to the terminal with a NACK response (instructing the terminal to resend the Bluetooth data in a next time period).

Figure 2:
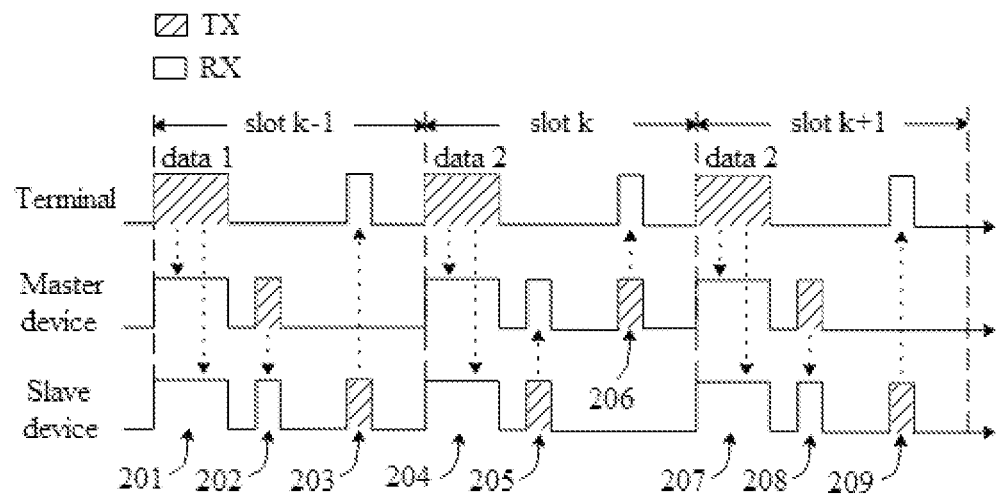
FIG. 2 is a timing diagram showing a master device and a slave device alternately serving as a responder at an interval of one or more consecutive slots according to the present disclosure.

In an embodiment, reference is made to FIG. 2, which is a timing diagram showing a master device and a slave device alternately serving as a responder at an interval of one or more consecutive slots. In slot k−1, the slave device serves as a responder. The slave device obtains a result of receiving data by the master device in a packet 202, and responds to the terminal in a packet 203 based on the result of receiving data by the master device and a result of receiving data by the slave device. In FIG. 2, the packet 203 includes an ACK response which indicates that the master device and the slave device successfully receive data data1 and instructs the terminal to send a next piece of data. In slot k, the master device replaces the slave device to serve as the responder. The master device obtains a result of receiving data by the slave device in a packet 205, and responds to the terminal in a packet 206 based on the result of receiving data by the slave device and a result of receiving data by the master device. In FIG. 2, the packet 206 includes a NACK response which indicates that at least one of the master device and the slave device fails to receive data data2 and instructs the terminal to resend the data data2. In slot k+1, the slave device replaces the master device to serve as the responder. The slave device obtains a result of receiving data by the master device in a packet 202, and responds to the terminal in a packet 203 based on the result of receiving data by the master device and a result of receiving data by the slave device.

It should be understood that, in the embodiment, the master device and the slave device alternately serve as the responder where the master device or the slave device serves as the responder for one slot, effectively balancing the power consumptions of the master device and the slave device. In a variation of the above embodiment, an alternation period may include multiple consecutive slots, and the master device and the slave device alternately serve as the responder where the master device or the slave device serves as the responder for one alternation period. For example, the slave device serves as the responder in first two slots, and the master device serves as the responder in next two slots.

In an embodiment, the master device and the salve device of the wireless device alternately serve as a responder. Specifically, one of the master device and the salve device determines, based on a result of receiving data by the device itself, a responder to respond to the terminal. In the embodiment, as a responder, the master device or the slave device responds to the terminal without obtaining a result of receiving data by the non-responder, thereby saving bandwidth consumption. The following two scenarios may be included.

In scenario A2, one of the master device and the slave device, in a case of successfully receiving data, instructs the other one of the master device and the slave device to serve as the responder. The responder responds to the terminal based on a result of receiving data by the responder. The responder responds to the terminal with an ACK response if the responder successfully receives data, and responds to the terminal with a NACK response if the responder fails to receive data.

In scenario A3, one of the master device and the slave device, in a case of failing to receive data, serves as the responder and directly responds to the terminal with a NACK response.

In the scenarios A2 and A3, assuming that the master device serves as the responder and the slave device serves as the non-responder, the slave device, on reception of an indication from the master device indicating an successfully reception, knows that the master device has successfully received data. If the master device fails to receive data, the master device directly responds to the terminal without sending the indication to the slave device, thereby reducing the bandwidth consumption.

In the above embodiments, the responder may be determined from the wireless device by managing the response authority of the master device and the slave device, including temporary response authority management and communication response authority management.

Following are the specific descriptions.

I. Temporary Response Authority Management

In an embodiment, the alternately serving, by the master device and the slave device of the wireless device, as a responder may include:
  configuring one of the master device and the slave device of the wireless device as a fixed authority manager, where the other one of the master device and the slave device of the wireless device is a non-authority manager;
  notifying, by the authority manager, the non-authority manager to serve as a responder in a current slot in a case that the authority manager successfully receives Bluetooth data from the terminal in the current slot; and serving, by the authority manager, as a responder in a current slot in a case that the authority manager fails to receive Bluetooth data from the terminal in the current slot.

In the temporary response authority management, one of the master device and the slave device is preconfigured as a fixed authority manager. The master device or the slave device may be fixedly configured as the authority manager for managing the temporary response authority of the master device and the slave device in communication with the terminal based on the result of receiving data by the authority manager. The temporary response authority management may be performed as follows. In a case that the authority manager successfully receives data, the authority manager notifies the non-authority manager to serve as the responder in the current slot. In a case that the authority manager fails to receive data, the authority manager assigns the temporary response authority to the authority manager itself to serve as the responder.

In a case that the authority manager successfully receives data, the authority manager assigns the temporary response authority to the non-authority manager and the non-authority manager serves as the responder to respond to the terminal. In a case that the authority manager fails to receive data, the authority manager assigns the temporary response authority to the authority manager itself to serve as the responder to respond to the terminal. In this way, the authority manager and the non-authority manager alternately respond to the terminal, saving the bandwidth consumption and balancing the power consumptions of the master device and the slave device.

Figure 3:
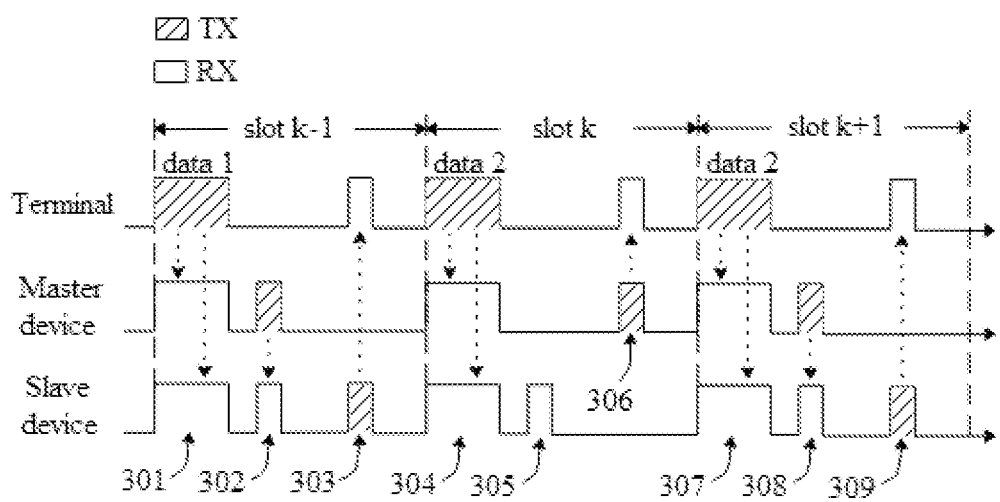
FIG. 3 is a timing diagram of temporary response authority management performed by an authority manager in communication according to the present disclosure.

In an embodiment, reference is made to FIG. 3, which is a timing diagram of temporary response authority management performed by an authority manager in communication. In FIG. 3, the master device is the authority manager. Based on the scenarios A2 and A3, in slot k−1, after successfully receiving data data1 in a packet 301, the master device determines that the salve device serves as the responder and assigns the response authority to the slave device in a packet 302 via the second Bluetooth link. The slave device responds to the terminal in a packet 303 based on the result of receiving data by the slave device. In FIG. 3, the packet 303 includes an ACK response which indicates that the master device and the slave device successfully receives the data data1 and instructs the terminal to send a next piece of data. In the slot k, the master device fails to receive data data2 in a packet 304, then the master device determines that the master device serves as the responder and assigns the response authority to the master device in a packet 305. The master device does not communicate with the slave device and responds to the terminal in a packet 306 with a NACK response which indicates that at least one of the master device and the slave device fails to receive the data data2 and instructs the terminal to resend the data data2. In slot k+1, after successfully receiving the data data2 in a packet 307, the master device determines that the slave device serves as the responder and assigns the response authority to the slave device in a packet 308 via the second Bluetooth link. The slave device responds to the terminal in a packet 309 based on the result of receiving data by the slave device.

II. Communication Response Authority Management

In an embodiment, the alternately serving, by the master device and the slave device of the wireless device, as a responder may include: determining a responder serving in a current slot based on a result of receiving Bluetooth data in the current slot by a responder serving in a previous slot.

The temporary response authority management may be performed as follows. In a case that the responder in the previous slot successfully receives Bluetooth data in the current slot, the responder in the previous slot notifies the non-responder serving in the previous slot to serve as the responder in the current slot. In a case that the responder serving in the previous slot fails to receive Bluetooth data in the current slot, the responder in the previous slot serves as the responder in the current slot.

In the embodiment, after one of the master device and the slave device of the wireless device is configured as an initial responder, the responder, that is, the master device or the slave device, serving in the previous timeslot manages the communication response authority of the master device and the slave device in the current slot based on the result of receiving data by the responder in communication with the terminal in the current slot. The communication response authority is not fixedly assigned to the master device or the slave device and is transferred with the responder. The communication response authority may be managed as follows. In a case that the responder successfully receives data, the responder transfers the communication response authority to the non-responder to cause the non-responder to serve as the responder. In a case that the responder fails to receive data, the responder reserves the communication response authority to continuously serve as the responder.

In an embodiment, reference is made to FIG. 2, based on the scenario A1, the master device has the communication response authority in slot k−1. In slot k−1, the master device transfers the communication response authority to the slave device in the packet 202 via the second Bluetooth link, and the master device sends a result of receiving data by the master device to the slave device. After obtaining the communication response authority, the slave device serves as the responder and responds to the terminal in the packet 203 based on the result of receiving data by the master device and a result of receiving data by the slave device. In FIG. 2, the packet 203 includes an ACK response which indicates that the master device and the slave device successfully receive data data1 and instructs the terminal to send a next piece of data. In slot k, the slave device transfers the communication response authority to the master device in the packet 205 via the second Bluetooth link, and the slave device sends a result of receiving data by the slave device to the master device. After obtaining the communication response authority, the master device serves as the responder and responds to the terminal in the packet 206 based on the result of receiving data by the salve device and a result of receiving data by the master device. In FIG. 2, the packet 206 includes a NACK response which indicates that at least one of the master device and the salve device fails to receive data data2 and instructs the terminal to resend the data data2. In slot k+1, the master device transfers the communication response authority to the slave device in the packet 208 via the second Bluetooth link, and the master device sends a result of receiving data by the master device to the slave device. After obtaining the communication response authority, the slave device serves as the responder and responds to the terminal in the packet 209 based on the result of receiving data by the master device and a result of receiving data by the slave device.

Figure 4:
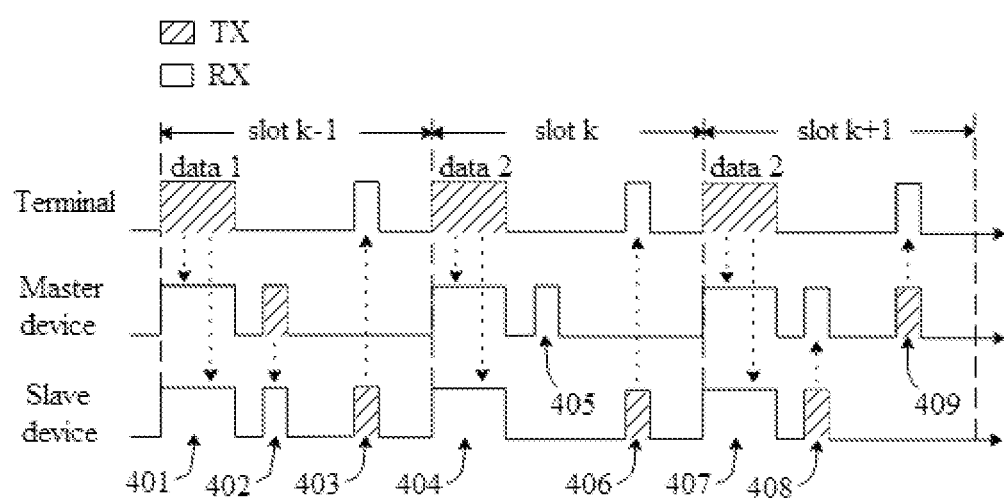
FIG. 4 is a timing diagram of communication response authority management performed by a master device and a slave device in communication according to the present disclosure.

In an embodiment, reference is made to FIG. 4, which is a timing diagram of communication response authority management performed by a master device and a salve device in scenarios A2 and A3. Based on the scenarios A2 and A3, the master device has the communication response authority in slot k−1. In slot k−1, after successfully receiving data data1 in a packet 401, the master device determines that the slave device serves as the responder. The master device transfers the communication response authority to the salve device in a packet 402 via the second Bluetooth link. The slave device responds to the terminal in a packet 403 based on a result of receiving data by the slave device. In FIG. 4, the packet 403 includes an ACK response which indicates that the master device or the slave device successfully receives data data1 and instructs the terminal to send a next piece of data. In slot k, the slave device has the communication response authority. In slot k, the slave device fails to receive data data2 in a packet 404, the slave device determines that the slave device serves as the responder. The slave device reserves the communication response authority in a packet 405, does not communicate with the master device, and responds to the terminal in a packet 406 with a NACK response which indicates that at least one of the master device and the slave device fails to receive data data2 and instructs the terminal to resend the data data2. In slot k+1, after successfully receiving the data data2 in a packet 407, the slave device determines that the master device serves as the responder. The slave device transfers the communication response authority to the master device in a packet 408 via the second Bluetooth link. The master device responds to the terminal in a packet 409 based on a result of receiving data by the master device.

Based on the above embodiment, in a case that the responder successfully receives data, the communication response authority is transferred from the responder to the non-responder, and the non-responder serves as a new responder having the communication response authority. In a case that the responder fails to receive data, the responder reserves the communication response authority. The communication response authority is transferred between the master device and the slave device in this way, thereby saving the bandwidth consumption and balancing the power consumptions of the master device and the salve device.

In the temporary response authority management and the communication response authority management, the authority manager may fail to assign the temporary response authority and the responder may fail to transfer the communication response authority. As shown in FIG. 3, the temporary response authority may be failed to be assigned in packets 302, 305 or 308. As shown in FIG. 2, the communication response authority may be failed to be transferred in packets 202, 205 or 208. As shown in FIG. 4, the communication response authority may be failed to be transferred in packets 402, 405 or 408. In the temporary response authority management, the response authority for each piece of data is independent and the response authority for a current data is temporary. Therefore, in a case that the temporary response authority for a piece of data is failed to be assigned, the temporary response authority for subsequent data is assigned temporarily by the authority manager without affecting the timeliness of response and the efficiency of data transmission with the terminal.

However, in the communication response authority management, the communication response authority is transferred between the master device and the slave device. In a case that the communication response authority is failed to be transferred, the communication response authority is lost, and both the master device and the slave device have no communication response authority, affecting response and data transmission. The terminal, without receiving a response, sends of the same data repeatedly, greatly reducing the efficiency of data transmission. The master device and the slave device may not operate normally if no solution to the problem is provided.

Therefore, the communication response authority management further includes: performing, by the wireless device, an authority reset operation at a predetermined time interval to designate the master device or the slave device as the responder in the current slot. Before the master device and the salve device start to operate, an authority preset operation is performed to initially assign the communication response authority. After synchronization is performed via the first Bluetooth link, an authority reset operation is performed at a predetermined time interval to avoid the loss of the communication response authority.

Figure 5:
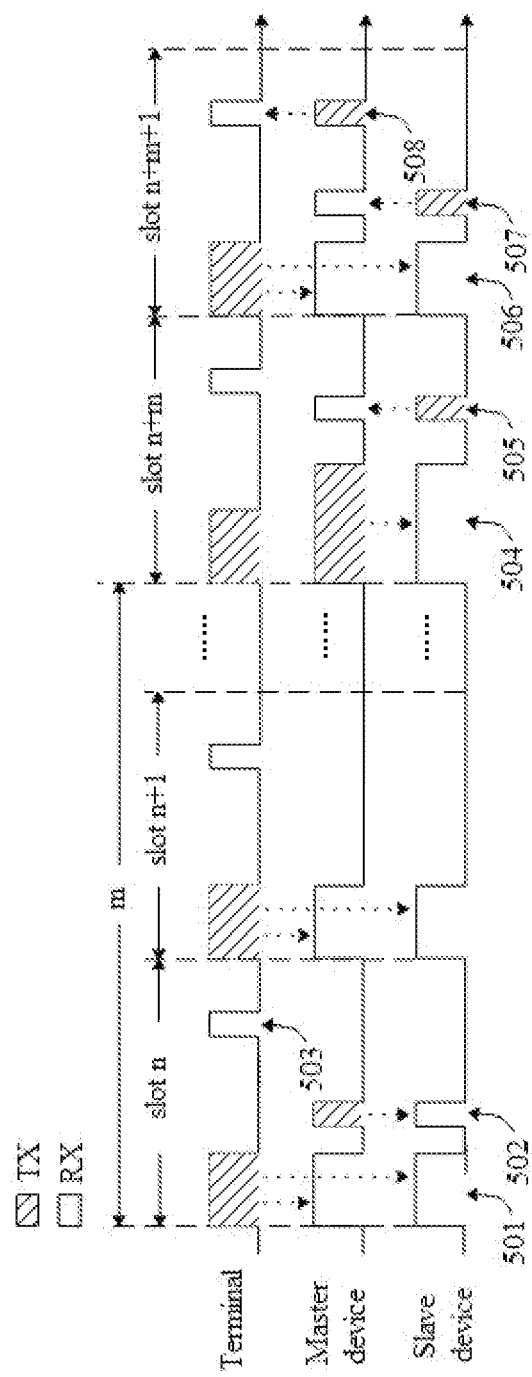
FIG. 5 is a timing diagram showing a case in which communication response authority is lost and an authority reset operation is performed according to the present disclosure.

In an embodiment, reference is made to FIG. 5, which is a timing diagram showing a case in which communication response authority is lost and an authority reset operation is performed. In FIG. 5, the communication response authority is pre-assigned to the slave device. In slot n, the communication response authority is failed to be transferred from the master device to the slave device in a packet 502, and both the master device and the slave device have no communication response authority. From slot n+1, no responder responds to the terminal since both the master device and the slave device have no communication response authority. In subsequent communication, if the master device and the slave device do not perform an authority reset operation, the terminal keeps sending the same piece of data until reaching a maximum number of attempts. In slot n+m, the master device and the slave device perform an authority reset operation in a packet 504 at a predetermined time interval m as shown in FIG. 5 to restore the pre-assignment of the communication response authority, and the master device and the slave device indicate a result of the authority reset operation in a packet 505. After the authority preset operation is performed successfully, in slot n+m+1, the slave device, serving as the responder in the previous slot, operates as described in scenarios A2 and A3, and so on.

As described above, the terminal resends the same piece of data with a maximum number of attempts. If the predetermined time interval is too long, the master device and the slave device may miss multiple pieces of data sent by the terminal. Therefore, in order to ensure that the master device and the slave device do not miss each piece of data sent by the terminal, in the authority preset operation, the predetermined time interval is preferably less than the maximum number of attempts with which the terminal sends the same piece of Bluetooth data.

Figure 6:
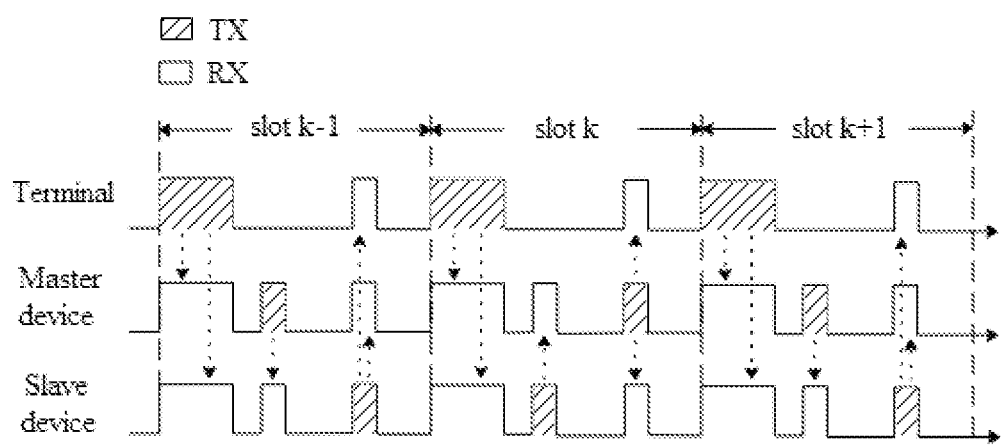
FIG. 6 is a timing diagram showing monitoring, by a non-responder, a responder responding to a terminal according to the present disclosure.

In order to improve the stability of authority assignment and authority transfer, the communication method may further include monitoring, by the non-responder, the response message while the responder responds to the terminal. As shown in FIG. 6, in slot k−1, after transferring the communication response authority to the slave device, the master device monitors the response from the slave device, which is performed in slot k and slot k+1, ensuring the stability of the communication between the master device, the slave device and the terminal, and facilitating detecting the loss of the communication response authority in advance.

Based on the above embodiments, a wireless device is further provided according to the present disclosure. The wireless device includes a memory and a processor. The memory stores a computer program. The wireless device executes the computer program by using the processor to perform the Bluetooth communication method. For the descriptions of the device, one may refer to the relevant descriptions and effects of the above embodiments for understanding, which are not repeated herein.

Based on the above embodiments, a non-transitory computer readable storage medium is further provided according to the present disclosure. The non-transitory computer readable storage medium stores a computer program. The computer program, when executed by a processor, performs the Bluetooth communication method. For the descriptions of the program, one may refer to the relevant descriptions and effects of the above embodiments for understanding, which are not repeated herein.

In the present disclosure, the computer readable medium may be a tangible medium that may include or store a program for use by an instruction execution system, apparatus or device or for use in combination with an instruction execution system, apparatus or device. The computer readable medium may be a computer readable signal media or a computer readable storage media. The computer readable medium may include, but is not limited to, an electronic, magnetic, optical, electromagnetic, infrared, or semiconductor system, apparatus or device, or any proper combination thereof. The computer readable storage medium may include an electrical connection based on one or more wires, a portable computer disk, a hard disk, a random access memory (RANI), a read-only memory (ROM), an erasable programmable read-only memory (EPROM or fast flash memory), an optical fiber, a portable compact disk read-only memory (CD-ROM), an optical storage device, a magnetic storage device, or any proper combination thereof.

The essential part of the technical solution of the present disclosure or the part of the technical solution of the present disclosure contributed to the conventional technology or all of or a part of the technical solution may be embodied in a form of a software product. The computer software product is stored in a storage medium which includes several instructions to make a computer device (may be a personal computer, a server, a network device or the like) execute all or a part of steps of the method according to each embodiment of the present disclosure. The storage medium described above includes various mediums which can store program codes, such as a USB flash disk, a mobile hard disk, a read-only memory (abbreviated as "ROM"), a random access memory (abbreviated as "RAM"), a disk, and an optical disc.

The embodiments described above are only provided for describing the technical solutions of the present disclosure rather than limiting the technical solutions. Although the present disclosure is described in detail with reference to the embodiments described above, those skilled in the art should understand that modifications may be made to the technical solutions described in the above embodiments or equivalent substitutions may be made to a part or all of the technical features. These modifications or substitutions do not enable the essence of the corresponding technical solutions to depart from the scope of the technical solutions according to the embodiments of the present disclosure.

The invention claimed is:

1. A communication method for a wireless device, wherein:
   the wireless device comprises a master device and a slave device; and
   the communication method for the wireless device comprises:
   communicating, by the master device, with a terminal via a first Bluetooth link, communicating, by the master device, with the slave device via a second Bluetooth link, and sending, by the master device, link information of the first Bluetooth link to the slave device via the second Bluetooth link;
   monitoring, by the slave device, the first Bluetooth link, and receiving, by the slave device, Bluetooth data sent by the terminal to the master device;
   alternately serving, by the master device and the slave device of the wireless device, as a responder; and
   sending, by the responder, a response message to the terminal via the first Bluetooth link, wherein the response message indicates a result of receiving the Bluetooth data by the wireless device.

2. The method according to claim 1, wherein the alternately serving, by the master device and the slave device of the wireless device, as a responder comprises:
   alternately serving, by the master device and the slave device of the wireless device, as the responder at an interval of one or more consecutive slots.

3. The method according to claim 1, wherein the alternately serving, by the master device and the slave device of the wireless device, as a responder comprises:
   configuring one of the master device and the slave device of the wireless device as a fixed authority manager, wherein the other one of the master device and the slave device of the wireless device is a non-authority manager;
   notifying, by the authority manager, the non-authority manager to serve as a responder in a current time slot in a case that the authority manager successfully receives Bluetooth data from the terminal in the current time slot; and
   serving, by the authority manager, as a responder in a current timeslot in a case that the authority manager fails to receive Bluetooth data from the terminal in the current time slot.

4. The method according to claim 1, wherein the alternately serving, by the master device and the slave device of the wireless device, as a responder comprises:
   determining a responder serving in a current time slot based on a result of receiving Bluetooth data in the current time slot by a responder serving in a previous time slot.

5. The method according to claim 4, wherein the determining a responder serving in a current time slot based on a result of receiving Bluetooth data in the current time slot by a responder serving in a previous time slot comprises:
   notifying, by the responder in the previous time slot, a non-responder in the previous time slot to serve as the responder in the current time slot in a case that the responder in the previous time slot successfully receives the Bluetooth data in the current time slot, wherein the non-responder is one of the master device and the slave device that does not serve as the responder; and
   serving, by the responder in the previous time slot, as the responder in the current time slot in a case that the responder serving in the previous time slot fails to receive the Bluetooth data in the current time slot.

6. The method according to claim 5, further comprising:
   performing, by the wireless device, an authority reset operation at a predetermined time interval to designate the master device or the slave device as the responder in the current time slot.

7. The method according to claim 6, wherein the predetermined time interval is less than a time period required for the terminal to send a same piece of Bluetooth data with a maximum number of attempts.

8. The method according to claim 1, further comprising:
   monitoring, by a non-responder, the response message while the responder sends the response message to the terminal, wherein the non-responder is one of the master device and the slave device that does not serve as the responder.

9. A wireless device, comprising
   a memory, storing a computer program; and a processor, configured to execute the computer program stored in the memory to perform the method according to claim 1.

10. A computer readable storage medium storing a computer program, wherein the computer program, when executed by a processor, performs the method according to claim 1.

* * * * *